United States Patent

Gyugyi

[15] 3,641,417

[45] Feb. 8, 1972

[54] INPUT FILTER CIRCUIT FOR CYCLOCONVERTER APPARATUS

[72] Inventor: Laszlo Gyugyi, Pittsburgh, Pa.

[73] Assignee: Westinghouse Electric Corporation, Pittsburgh, Pa.

[22] Filed: Sept. 15, 1970

[21] Appl. No.: 72,392

[52] U.S. Cl. ................................321/7, 321/9 R, 321/66, 321/69 R
[51] Int. Cl. ..................................H02m 1/12, H02m 5/30
[58] Field of Search ........................321/3, 5, 7, 9, 60, 65, 66; 307/105

[56] References Cited

UNITED STATES PATENTS

| 3,431,483 | 3/1969 | Lafuze | 321/7 |
| 3,295,045 | 12/1966 | Domizi | 321/7 |
| 3,555,291 | 1/1971 | Dewey | 321/9 |

*Primary Examiner*—William H. Beha, Jr.
*Attorney*—F. H. Henson, Michael P. Lynch and Charles F. Renz

[57] ABSTRACT

The invention relates to an electrical filter circuit operatively coupled between the output of a polyphase power source exhibiting measurable impedance and the inputs of a cycloconverter apparatus; the filtering circuit including coupled inductors connected between phases of the power source to shunt the unwanted frequency components generated by the cycloconverter apparatus in order to decrease the distortion of the terminal voltage of the polyphase power source, and to improve the input power factor of the cycloconverter.

5 Claims, 3 Drawing Figures

PATENTED FEB 8 1972

3,641,417

INPUT FILTER CIRCUIT FOR CYCLOCONVERTER APPARATUS

BACKGROUND OF THE INVENTION

The cycloconverter is often defined to be a frequency changer in that it operates to convert an input signal from a power source of one frequency into an output signal of a second frequency which is some ratio of the input frequency. The output waveform generated by the cycloconverter is not a pure sinewave; rather, it is comprised of the desired fundamental component and an infinite number of unwanted frequency components. Efforts to remove the harmonic distortion present in the output generally entail the use of output filter means. Since the output filter normally utilized includes a series inductor and a shunt capacitor, i.e., LC filter, the harmonic voltages encounter a high-impedance circuit in the form of the filter and therefore, the output current supplied by the cycloconverter is nearly sinusoidal. As a result of this, the cycloconverter draws a substantially nonsinusoidal, i.e., distorted, current from the power source, even though the voltages of the power source are basically sinusoidal. A wave shape of the current drawn from the power source is similar to the unfiltered output voltage waveform of the cycloconverter in that it has a fundamental component with the frequency of the power source and an infinite number of additional frequency components. This distorted current results in several undesirable operational characteristics including:

a. distorting the terminal voltage of the power source if the power source exhibits significant output impedance;

b. exhibiting a high RMS current value which necessitates an increase in the rating of the power source in order to supply the harmonic KVA; and c. producing radiofrequency interference if the frequency of the current harmonics is sufficiently high.

The use of conventional tuned filters to overcome these characteristics has not proven successful since the input current harmonics are functions of both the supply frequency and the output frequency, both of which can vary over a range depending on the application. For instance in a variable speed-constant frequency (VSCF) application the input frequency may vary, while in a motor speed control application the output frequency may vary. Furthermore, the use of shunt capacitors at the input of the cycloconverter have not been successful due to the fact that these capacitors have to be large to accommodate appreciable harmonic attenuation, and due to their size these capacitors draw a large leading current, particularly in VSCF applications, which requires an increase in the volt-ampere rating of the power source, which in some instances, can drive the power source into complete self excitation.

SUMMARY OF THE INVENTION

This invention relates to a novel filter circuit for use with a cycloconverter of either the naturally commutated type or force-commutated type as a means for reducing current harmonics generated by the operation of the cycloconverter. The filter circuit includes inductors operatively coupled between appropriate phases of a polyphase power source which is supplying the input to the cycloconverter. This filter is particularly designed for use with a "soft" power source, i.e., one with a relatively high output impedance, such as a generator, as a means for eliminating the adverse effects of source impedance which contributes to the generation of current harmonics by the cycloconverter. This filter provides a low-impedance path at the cycloconverter input for the current harmonics thereby preventing the circulation of these current harmonics through the power source and the accompanying voltage drops which would be developed across the power source impedance. The absence of these current harmonics in the power source therefore enables the current drawn from the power source by the cycloconverter to be essentially sinusoidal thereby reducing the distortion in the terminal voltage of the polyphase power source which results in decreased distortion in the output waveform, improving the input power factor resulting in a decrease of the input KVA requirements, and decreasing the danger of radiofrequency interference.

It is noted that an input filter is not only desirable but, indeed essential, for the proper operation of the force-commutated type of cycloconverter if the prime power source has a relatively high output impedance. The reason for this is the fact that the operation of a force commutated cycloconverter is based on "artificial" commutation, i.e., semiconductor switches carrying current are forcefully turned off before other switches are turned on to take over the conduction. In other words, the switches are operated in a "break-before-make" mode. Clearly, if the power source has a finite and primarily inductive output impedance, some means must be provided to handle the stored inductive energy to avoid potentially damaging voltage surges across the semiconductor switches during commutation.

The novel input filter arrangement disclosed herein functions to:

a. reduce the distortion of the terminal voltage of the power source caused by the cycloconverter drawing a nonsinusoidal current from the power source. In the absence of such a filter, the distorted power source voltage would increase the distortion in the cycloconverter output voltage and thus would necessitate increased filtering of the cycloconverter output; and b. suppress the voltage transients generated by the force commutated mode of cycloconverter operation which forces current interruptions in the power source inputs to the cycloconverter. Without this suppression the resulting transients might destroy the cycloconverter semiconductor switches.

The invention will become more readily apparent from the following exemplary description in connection with the accompanying drawing.

DESCRIPTION OF THE PREFERRED EMBODIMENT

Figure 1:
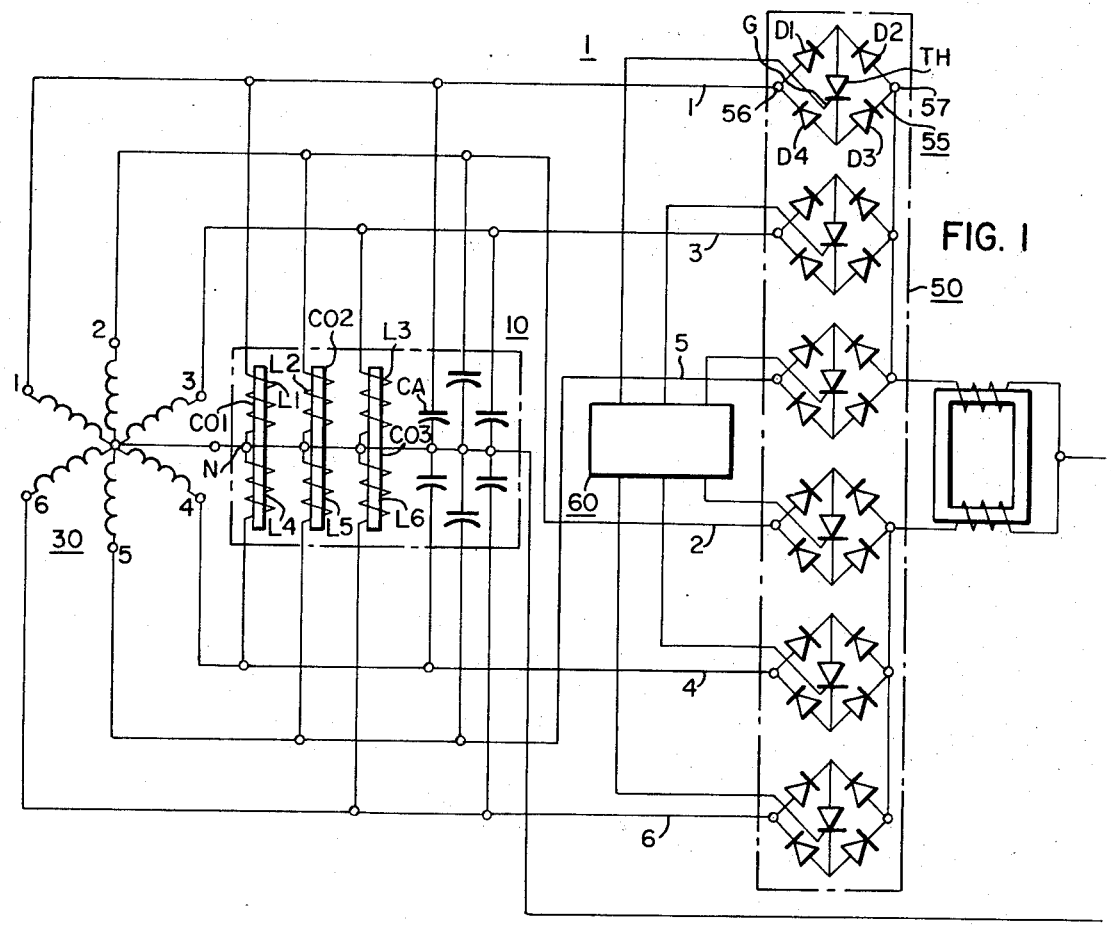
FIG. 1 is a basic schematic of a single-phase cycloconverter operated from a six-phase power source and incorporating an embodiment of the invention.

The novel cycloconverter input filtering technique illustrated in Fig. 1 in conjunction with a six-phase power source is applicable to cycloconverter power systems in which the number of input phase voltages to the cycloconverter from the power source is 3M, where M is a positive integer other than 1.

Referring to the drawing the novel cycloconverter input filtering technique is illustrated schematically in a power system 1 comprising a filter circuit 10 intermediate the output phases of a power source, herein designated to be a generator 30, and a single-phase cycloconverter circuit 50 operated in the force-commutated mode. This configuration has been selected for its simplicity in order to enhance the understanding of the invention.

In operation, the output of the generator 30 is supplied to the cycloconverter circuit 50 which converts the output of the generator to alternating current of a frequency different from the generator frequency. The operation of the cycloconverter circuit 50 is controlled by a control means 60 which supplies control current or control signals to effect operation of the switching devices of the frequency cycloconverter at the necessary frequency to obtain the desired output frequency. The output voltage $V_o$ of the cycloconverter circuit is subsequently applied to a load (not shown).

The generator 30 is shown as a six-phase generator having six windings displaced 60° from each other as illustrated in Fig. 1 and connected to leads 1, 2, 3, 4, 5, and 6 respectively, which constitutes the input leads of the cycloconverter 50.

The cycloconverter 50 consists of an array of semiconductor switching circuits 55. A switching circuit 55 may be comprised of any suitable type of static device which is capable of being switched on and off at high frequency and which has bilateral conductivity. The circuit here shown consists of four diodes, D1, D2, D3, and D4 connected in a bridge circuit with terminal leads 56 and 57 connected to opposite corners of the bridge. A conduction-controlled switching device, herein illustrated as a gate turnoff thyristor TH, is connected across the other two corners of the bridge as shown and a control lead G is provided for applying a conduction control signal from the control means 60. In general, the switching circuit 55 may comprise any type of static device which blocks current flow in the absence of a control signal, permits current to flow in either direction when a control signal is supplied, and is capable of being switched at sufficiently high frequency to permit the type of operation required for the desired output. For more complete description of the operation of a cycloconverter, reference should be made to U.S. Pat. No. 3,170,107 issued Feb. 16, 1965 to Ralph D. Jessee and assigned to the assignee of the present invention.

The operative functions of the filtering technique to be described in conjunction with the power system 1 apply likewise to power systems incorporating input power sources, or generators, of 9, 12, 15, etc., phases, and cycloconverter circuit combinations providing polyphase output voltages. For instance, in order to fulfill the usual requirement for a three-phase, balance power system output, three cycloconverter circuits of the type illustrated in Fig. 1 would be used and the outputs of the three cycloconverter circuits phase displaced by 120°.

The phase current drawn from the generator 30 by the force-commutated cycloconverter circuit 50 can be expressed by the following analytical expression:

$$I_f = \alpha I_o [\sin \theta_f + \tfrac{1}{2}\sin(2\theta_f+3\theta_o) + \tfrac{1}{4}\sin(4\theta_f+3\theta_o) + \tfrac{1}{5}\sin(5\theta_f+6\theta_o) + \tfrac{1}{7}\sin(7\theta_f+6\theta_o) + \tfrac{1}{8}\sin(8\theta_f+9\theta_o) + \tfrac{1}{10}\sin(10\theta_f+9\theta_o) + \tfrac{1}{11}\sin(11\theta_f+12\theta_o) + \tfrac{1}{13}\sin(13\theta_f+12\theta_o) + \ldots] \quad (1)$$

where $\alpha = (3\sqrt{3})/4$ for the six-phase generator,
$\alpha = (\sqrt{3})/2$ for the nine-phase generator, $I_o$ = output current supplied by the converter
$\theta_f = 2\pi f_I t$
$\theta_o = 2\pi f_o t$ and
$f_I, f_o$ are the input and output frequencies respectively.

A close analysis of the current spectrum appearing in oppositely phase-displaced lines of the six-phase generator 30, i.e., lines 1 and 4, 2 and 5, and 3 and 6, discloses a similarity between the components of the currents flowing in these lines which supports the following tabulation of the current harmonic content of the currents in the opposite phases:

| Phase $\sin \theta_I$ | Phase $\sin(\theta_I - \pi) = -\sin \theta_I$ |
|---|---|
| ½ sin (2θ_I+3θ_o) | ½ sin (2θ_I+3θ_o) |
| ¼ sin (4θ_I+3θ_o) | ¼ sin (4θ_I+3θ_o) |
| 1/5 sin (5θ_I+6θ_o) | 1/5 sin (5θ_I+6θ_o−π) = −1/5 sin (5θ_I+6θ_o) |
| 1/7 sin (7θ_I+6θ_o) | 1/7 sin (7θ_I+6θ_o−π) = −1/7 sin (7θ_I+6θ_o) |
| ⅛ sin (8θ_I+9θ_o) | ⅛ sin (8θ_I+9θ_o) |
| 1/10 sin (10θ_I+9θ_o) | 1/10 sin (10θ_I+9θ_o) |
| 1/11 sin (11θ_I+12θ_o) | 1/11 sin (11θ_I+12θ_o−π) = −1/11 sin (11θ_I+12θ_o) |
| 1/13 sin (13θ_I+12θ_o) | 1/13 sin (13θ_I+12θ_o−π) = −1/13 sin (13θ_I+12θ_o) |

While these current components are related to the force-commutated type cycloconverter, these components plus additional current components are generally present in the naturally commutated cycloconverter.

As can be seen from the above tabulation, those current components whose argument has the generator frequency with an even multiplier (2, 4, 8, 10, etc.) are in phase in the opposite lines. The recognition of this relationship between the current components of opposite phases supports the use of closely coupled inductor pairs L1–L4, L2–L5, and L3–L6 between the oppositely phase-displaced generator voltage lines and the generator neutral N as a means for providing a short circuit for these current components thus avoiding circulation of these components through the generator windings. The close coupling requirement is essential to maintain the harmonic voltage appearing across the coupled inductor pairs essentially zero, so as to insure the shunting through the neutral N of the in phase current components of the currents associated with the generator voltages of opposite phases.

Individual inductor cores CO1, CO2, and CO3, may be utilized with each of the inductor pairs as illustrated in Fig. 1, or a three-element common core structure may be substituted. The inductor pairs function as harmonic bypass circuits by shunting current components in which the coefficient of the generator frequency term is an even number, thereby preventing the harmonic voltages at these frequencies from appearing across the generator terminals. It is noted that with the exception a small magnetizing current, no fundamental current, i.e., current with the generator frequency, flows through the harmonic bypass inductors. With the addition of the inductor pairs, the actual phase current drawn from the generator of Fig. 1 is expressed as:

$$I_f = (3\sqrt{3}/4\pi)I_o[\sin\theta_f + 1/5 \sin(5\theta_f+6\theta_o) + 1/7 \sin(7\theta_f+6\theta_o) + 1/11 \sin(11\theta_f+12\theta_o) + 1/13 \sin(13\theta_f+12\theta_o) + \ldots] \quad (2)$$

A comparison of equations (1) and (2) reveals a significant improvement in the current wave shape as a result of the operation of the inductor pairs. This improvement is manifested by the removal of the current components having the lowest frequency and highest amplitudes; such as ½ sin (2θ_f+3θ_o) and ¼ sin (4θ_f+3θ_o), which contribute most significantly to the distortion of the current wave shape. The remaining higher frequency components which represent less troublesome components, can be easily filtered by relatively small shunt capacitors CA connected across each generator phase as illustrated in FIG. 1.

The opportunity to use small shunt capacitors afforded by the operation of the inductor pairs all but eliminates problems encountered in conventional systems which are forced to use large capacitors. These problems include the establishment of a poor generator power factor which necessitates an increase in generator current to overcome the adverse affect of the large capacitors.

Furthermore, in both the force-commutated type and naturally commutated type cycloconverter, it is often necessary to include a resistor in series with each shunt capacitor to function as a dampening element to neutralize resonant conditions occuring as a result of the generator inductance and the capacitor. The reduction in capacitor size permitted as a result of the use of the inductor pairs results in a reduction of the size of the series resistor required to provide desired dampening.

The application of the discussion directed to the six-phase input source of FIG. 1 can be applied to sources whose phases are multiples of six as it is apparent that there will exist directly opposite generator phases. This is not true of a nine-phase source or sources which are odd multiples of 3 (i.e., 9, 15, 21, ...). In the latter group of sources, the use of inductor pairs as harmonic bypass circuits is equally applicable, but somewhat more complex in implementation due to the fact that there are no directly opposite phases in the source, as illustrated in the vector diagram for a nine-phase source illustrated in FIG. 3. The increased complexity lies in the requirement to establish the winding symmetry to produce the zero harmonic voltage condition necessary for the harmonic bypass operation of the closely coupled inductors. This requirement can be achieved through various techniques.

Figure 3:
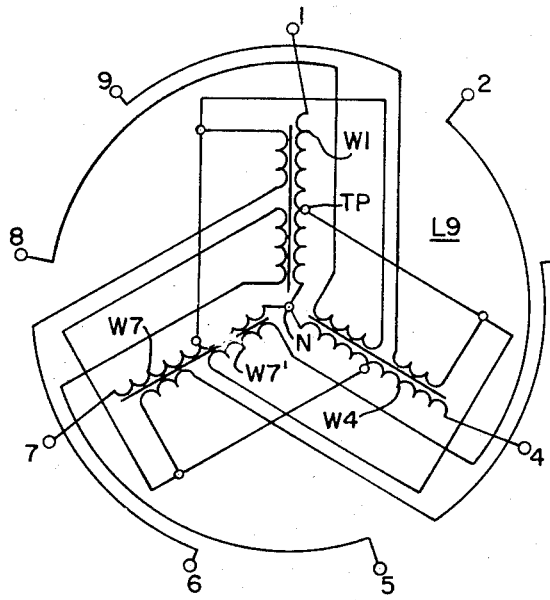
FIG. 3 is a vector diagram of the filter circuit of FIG. 2.
Figure 2:
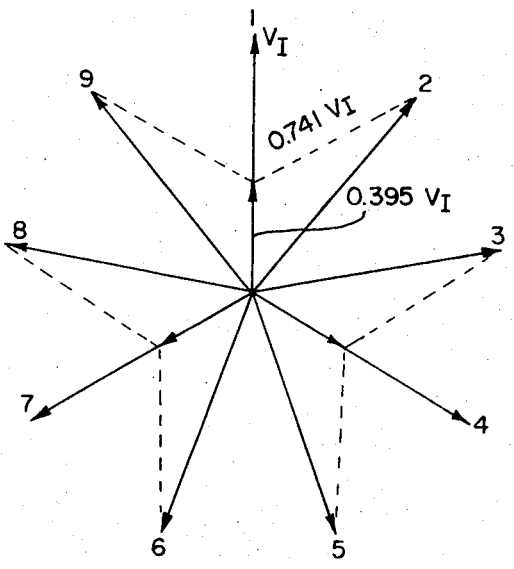
FIG. 2 is a schematic illustration of a filter circuit for use with a nine-phase power source.

One technique is schematically illustrated in FIG. 3 and vectorially represented in FIG. 2. The nine-phase inductor L9 is wound on a three-legged core. The main windings forming a symmetrical three-phase arrangement are W1, W4, and W7. The additional phases required for a symmetrical nine-phase arrangement are derived by establishing appropriate combinations of portions of the main windings. For example, phase 2 is obtained by adding an appropriate number of turns W7' from winding W7 to a tap TP on winding W1. The vector diagram of FIG. 2 shows the ratio between tap and total phase winding to be 0.395 and between additive windings and the total phase winding to be 0.741. These ratios also reflect the amount of voltage appearing across each constituent winding at the supply frequency.

The generator phase current corresponding to the filter configuration of FIGS. 2 and 3 is:

$$I_f = (\sqrt{3}/2\pi)I_0[\sin \theta_t + \tfrac{1}{8} \sin (8\theta_t + 9\theta_o) + 1/10 \sin (10\theta_t + 9\theta_o) + 1/17 \sin (17\theta_t + 18\theta_o) + 1/19 \sin (19\theta_t + 18\theta_o) + ...] \quad (3)$$

Comparing equation (3) to equation (1), it is apparent that most of the current harmonics flow through the bypass inductors thereby producing a generator current which is approximately sinusoidal. The remaining harmonics can be removed by shunt capacitors in a manner described above.

Due to the emphasis on inductance in the filter circuit and the use of minimum capacitance, the filter circuit is largely independent of the generator frequency.

In applications of the filter circuit, the positioning of the filter circuit close to the cycloconverter circuit eliminates the transmission of the current harmonics over long cable lengths which could produce undesirable electrical interference.

I claim as my invention:

1. In a cycloconverter power system, the combination of, a polyphase power source exhibiting measurable impedance, the number of phases of said polyphase power source being equal to 3M, where M is an integer other than 1,
   a cycloconverter circuit means having a plurality of input leads operatively connecting the phases of said polyphase power source to said cycloconverter circuit, output leads operatively connected to a load, said cycloconverter circuit means including a plurality of controlled switching devices for controllably completing a circuit between said input leads and said output leads in a manner to develop a current waveform at said output leads having a selected fundamental frequency component, and
   a cycloconverter input circuit means including inductive means operatively coupled between said input leads to shunt cycloconverter input current waveform frequency components other than the fundamental frequency component thereby preventing the circulation of said frequency components through said polyphase power source, said inductive means including a plurality of inductors connected in closely coupled symmetrical inductor arrangements between said input leads to shunt the input current waveform frequency components having a vector sum equal to zero.

2. In a cycloconverter power system, the combination of, a polyphase power source exhibiting measurable impedance, the number of phases of said polyphase power source being equal to 3M, where M is an integer other than 1,
   a cycloconverter circuit means having a plurality of input leads operatively connecting the phases of said polyphase power source to said cycloconverter circuit, output leads operatively connected to a load, said cycloconverter circuit means including a plurality of controlled switching devices for controllably completing a circuit between said input leads and said output leads in a manner to develop a current waveform at said output leads having a selected fundamental frequency component, and
   cycloconverter input circuit means including inductive means operatively coupled between said input leads to shunt cycloconverter input current waveform frequency components other than the fundamental frequency component thereby preventing the circulation of said frequency components through said polyphase power source wherein said inductive means includes a plurality of inductors connected in closely coupled symmetrical inductor arrangements between said input leads and an electrical neutral to shunt the input current waveform frequency components having a vector sum equal to zero.

3. In a cycloconverter power system as claimed in claim 2 wherein the number of phases of said polyphase power source is equal to 3M where M is an even number, and said closely coupled symmetrical inductor arrangements are connected between opposite phases of said polyphase source and said electrical neutral to shunt the input current waveform frequency components in the respective opposite phases which are electrically in phase.

4. In a cycloconverter power system as claimed in claim 3 wherein a first end of each of said closely coupled symmetrical inductor arrangements is connected to one of said input leads and a second end is connected to the electrical neutral of said polyphase power source.

5. In a cycloconverter power system as claimed in claim 2 wherein said cycloconverter input filter means includes capacitor means connected in parallel with each of said inductors.

* * * * *